United States Patent [19]

Bouwma et al.

[11] 4,381,529

[45] Apr. 26, 1983

[54] MAGNETIC HEAD CONSTRUCTION

[75] Inventors: Jan Bouwma, Heerlen; Johannes Kerssen, Eindhoven, both of Netherlands

[73] Assignee: U.S. Philips Corporation, New York, N.Y.

[21] Appl. No.: 208,968

[22] Filed: Nov. 21, 1980

[30] Foreign Application Priority Data

Dec. 3, 1979 [NL] Netherlands ........................ 7908713

[51] Int. Cl.[3] ........................... G11B 5/20; G11B 5/14

[52] U.S. Cl. .................................... 360/123; 360/127

[58] Field of Search ............... 360/123, 121, 122, 126, 360/127

[56] References Cited

U.S. PATENT DOCUMENTS

| | | | |
|---|---|---|---|
| 4,019,206 | 4/1977 | Haas | 360/123 |
| 4,052,749 | 10/1977 | Nomura | 360/123 |
| 4,092,688 | 5/1978 | Nomura | 360/123 |
| 4,127,884 | 11/1978 | Nouchi | 360/127 |
| 4,143,458 | 3/1979 | Gibson | 360/127 |

*Primary Examiner*—Robert M. Kilgore

*Attorney, Agent, or Firm*—Joseph P. Abate

[57] ABSTRACT

A magnetic head construction includes a substrate of non-electrically conductive material supporting a number of integrated magnetic heads. This assembly is surrounded by a synthetic resin envelope in which a number of strip-shaped current conductors have parts which project from the envelope. The substrate is provided on an end of one of the current conductors. The integrated heads are connected to the conductor parts by means of respective connection conductors.

2 Claims, 5 Drawing Figures

5 20 21 22 16 18 17 19 30 15 13 23 23' 14

MAGNETIC HEAD CONSTRUCTION

BACKGROUND OF THE INVENTION

The invention relates to a magnetic head construction including a substrate of non-electrically conductive material supporting a number of layer-wise formed electromagnetic transducer elements which are connected to connection surfaces by means of connection conductors.

Until now, magnetic head constructions of the above-described type, sometimes termed integrated magnetic head constructions, have been used primarily in magnetic peripheral equipment for data-processing devices, in particular, disk memories. This usage has been highly determinative of the method of assembling these constructions and of the method of connecting them to the electric reading and writing circuits of the relevant disk memory. A typical example of such a construction is disclosed in Netherlands Patent Application No. 78 02185 laid open to public inspection. That disclosure, in particular FIGS. 3, 4 and 9, shows a glider composed of at least one thin rectangular substrate of non-magnetic, insulating material in which a number of integrated heads are fixed on one of the small sides of the relevant substrate by means of a glass cement method. Flat connection conductors are formed on the large sides so that the connection between the magnetic heads and the connection conductors takes place at an angle of 90°. The connection conductors terminate in connection surfaces on which flexible connection conductors are soldered. A protection element is secured over the side of the substrate with the integrated heads. Preferably, two substrates each supporting integrated heads on one small side and secured together by means of the protection element are used to compose the glider. This known method of assembling and connecting to external circuits is rather complicated and does not lead to a simple assembly method.

SUMMARY OF THE INVENTION

It is the object of the present invention to provide a magnetic head construction which can be assembled, mounted and connected electrically in a simple manner.

Thus, the magnetic head construction according to the invention is characterized in that it includes a synthetic resin casing in which the substrate with the transducer elements integrated thereon is embedded, and a number of spaced strip-shaped current conductors situated mainly in one plane and having flat parts projecting from the casing, one of the conductors, at its end situated inside the casing, having a flat portion on which the substrate is provided, the conductor parts being connected to the connection surfaces of the transducer elements by respective connection conductors.

Preferably, the casing exposes an edge of the substrate, and the edges of the relevant transducer elements adjoin the substrate edge.

BRIEF DESCRIPTION OF THE DRAWINGS

The invention will now be described in greater detail with reference to the accompanying drawing, in which.

DESCRIPTION OF THE PREFERRED EMBODIMENTS

Figure 1:
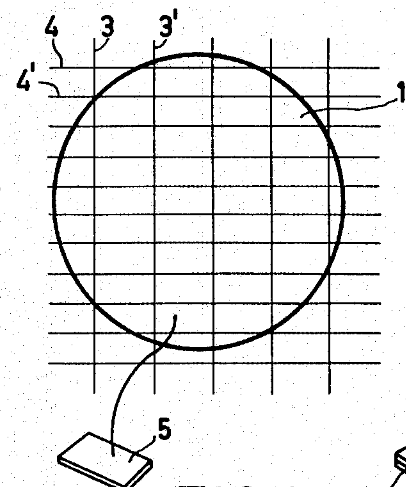
FIG. 1 is a plan view of a circular wafer for integrated magnetic heads and the lines along which it will be sawn into pieces so as to obtain individual substrates with integrated magnetic heads.

FIG. 1 is a plan view of a so-called wafer 1 which may consist of a slice of silicon having a diameter of 2.5 cm and a thickness of one or possible a few millimeters. This wafer supports a number of integrated magnetic heads, for example, of the type shown in FIG. 2, which are provided with a large density directly on the wafer. Smaller wafers (substrates) are obtained from the wafer 1 by sawing along the lines 3, 3', 4, 4' etc. and support a number of integrated magnetic heads. Such a smaller wafer 5 may support a number (for example, two) of integrated magnetic heads. The construction of such an integrated magnetic head will be described in greater detail with reference to FIG. 2.

The integrated magnetic head 2 comprises a magnetic circuit which includes two magnetic layers 6 and 7 provided one on top of the other and coupled to an electric winding 8. At a first end, the layers 6 and 7 are coupled together magnetostatically and, at the other end, they form a gap. The winding 8 is formed by one conductor layer or by a succession of conductor layers and electrically insulating layers provided one on top of the other in a direction perpendicular to the plane of the magnetic layers. The winding 8 is connected to connection surfaces 11 and 12 by connection conductors 9 and 10. Although the head described is of the inductive type, heads of the magnetoresistive type may also be used.

Figure 2:
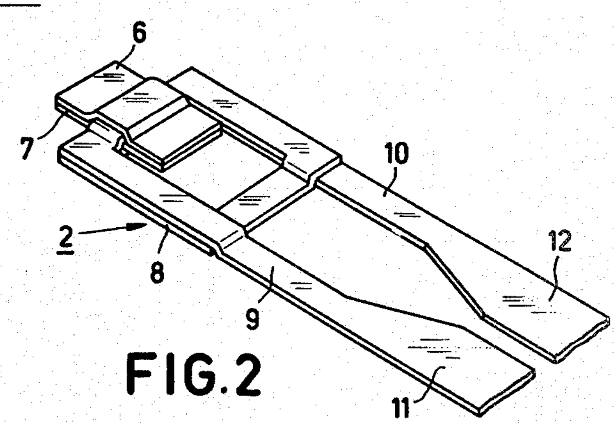
FIG. 2 shows an integrated magnetic head.
Figure 3:
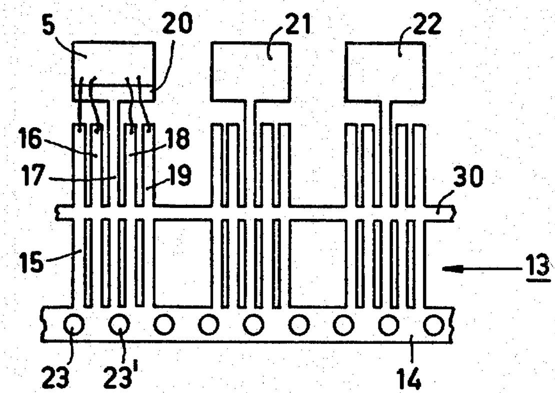
FIG. 3 shows a manufacturing comb for mounting substrates with integrated heads.

FIG. 3 shows a manufacturing comb 13 which is manufactured from a strip of sheet material. Comb 13 includes a strip 14 coupled with a number of groups of projecting, parallel-extending strip-shaped current conductors 15, 16, 17, 18 and 19. On one of these strips, e.g. strip 17, a substrate, such as the substrate 5 sawn from the wafer 1, is on a flat portion of its free end 20. Additional substrates sawn from the wafer 1 may also be connected on the free ends 21, 22. Prior to the connection, the substrates are positioned accurately, the holes 23, 23' etc. serve as references. The positioning of the substrates can be done with an accuracy of five microns. Connection surfaces on the substrates, for example, the connection surfaces 11 and 12 in FIG. 2, are connected to the strips by means of thin wires. A part of the strips is then embedded in a synthetic resin in a manner such that after curing, a casing is obtained in which the substrate is embedded efficiently. A bearing surface is then provided by means of grinding, the reference holes 23, 23' etc. serve to adjust a uniform distance of the heads on the substrates relative to the tape contact face.

Figure 4:
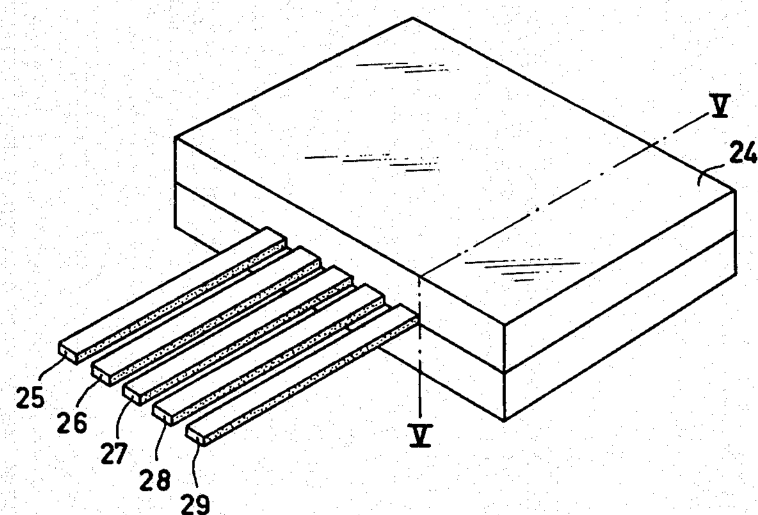
FIG. 4 again shows the comb but now with a part of its strip-shaped conductors in a synthetic resin casing.

FIG. 4 shows a manufacturing comb, as described with reference to FIG. 3, which is embedded in a synthetic resin casing 24. The strips 25, 26, 27, 28 and 29 are cut at a place above their connection strip (compare connection strip 30 in FIG. 3), so that components are formed which may be used for both electric connection and assembly.

Figure 5:
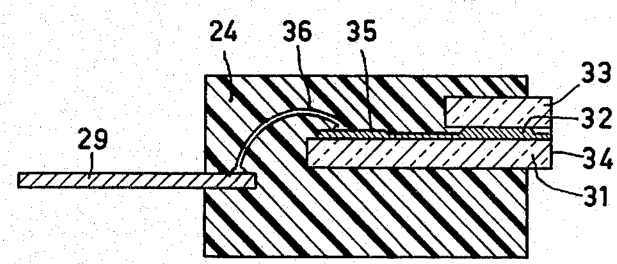
FIG. 5 is a sectional view taken on the line V—V of the construction shown in FIG. 4.

FIG. 5 is a cross-sectional view taken on the line V—V of the construction shown in FIG. 4. Substrate 31 with transducer element 32 is surrounded by the synthetic resin casing 24. However, this is not desired for all applications. In the cases in which the substrate does project, it is useful to provide the transducer elements, of which a transducer element 32 is visible in the drawing, on their free side, with a cover plate 33 of wear-resistive material. Such a cover plate may also serve as a support during the grinding of the tape contact face 34. Transducer element 32 is connected to a connection surface 35 which in turn is connected to the conductor strip 29 by means of a connection wire 36.

What is claimed is:

1. A magnetic head construction comprising a substrate of non-electrically conductive material, a number of layer-wise formed electromagnetic transducer elements supported on the substrate, and first connection conductors connecting the elements to connection surfaces on the substrate, characterized in that the construction further comprises a synthetic resin casing in which the substrate with the transducer elements integrated thereon is embedded, and a number of spaced strip-shaped current conductors situated mainly in one plane and having flat parts projecting from the casing, one of the current conductors, at its end situated inside the casing, having a flat portion on which the substrate is provided, the current conductor parts being connected to the connection surfaces of the transducer elements by respective second connection conductors.

2. A magnetic head construction as claimed in claim 1, characterized in that the casing exposes an edge of the substrate, and the edges of the transducer elements adjoin the substrate edge.

* * * * *